United States Patent [19]

Coburn

[11] 4,380,850
[45] Apr. 26, 1983

[54] HAND OPERATED STEAK TENDERIZER AND CUBER

[76] Inventor: Edwin H. Coburn, 17141 Frankfort Rd., Brooksville, Fla. 33512

[21] Appl. No.: 259,951

[22] Filed: May 4, 1981

[51] Int. Cl.³ ............................................. A22C 9/00
[52] U.S. Cl. ...................................................... 17/29
[58] Field of Search .................... 17/25, 26, 27, 29, 30, 17/31

[56] References Cited

U.S. PATENT DOCUMENTS

| | | | |
|---|---|---|---|
| 589,477 | 9/1897 | Maisonville | 17/29 |
| 942,448 | 12/1909 | Humeston | 17/29 |
| 2,092,654 | 9/1937 | Nigh | 17/29 |
| 2,453,334 | 11/1948 | Morgan | 17/26 |

*Primary Examiner*—Willie G. Abercrombie
*Attorney, Agent, or Firm*—Edwin W. Uren

[57] ABSTRACT

A portable and light-weight steak tenderizer for use in the home is provided with a rotatable cylinder along the curved surface of which are fixed a plurality of truncated triangular cutting blades arranged in rows normally oriented relative to the axis of rotation of the cylinder. The individual cutting blades that are arranged in alternating ones of these rows are perpendicularly oriented relative to the axis of rotation of the cylinder. The individual cutting blades that are arranged in the rows adjoining these alternating rows are acutely angled relative to the axis of rotation of the cylinder, with alternating rows of these adjoining rows having their truncated triangular cutting blades oppositely angled relative to the cutting blades of their alternately adjoining acutely angled rows. The rotatable cylinder is supported by a handle member by means of which the cylinder may be pressably passed over the planar surfaces of a steak or the like to thereby sever the surface tissue and to thus tenderize the steak.

2 Claims, 4 Drawing Figures

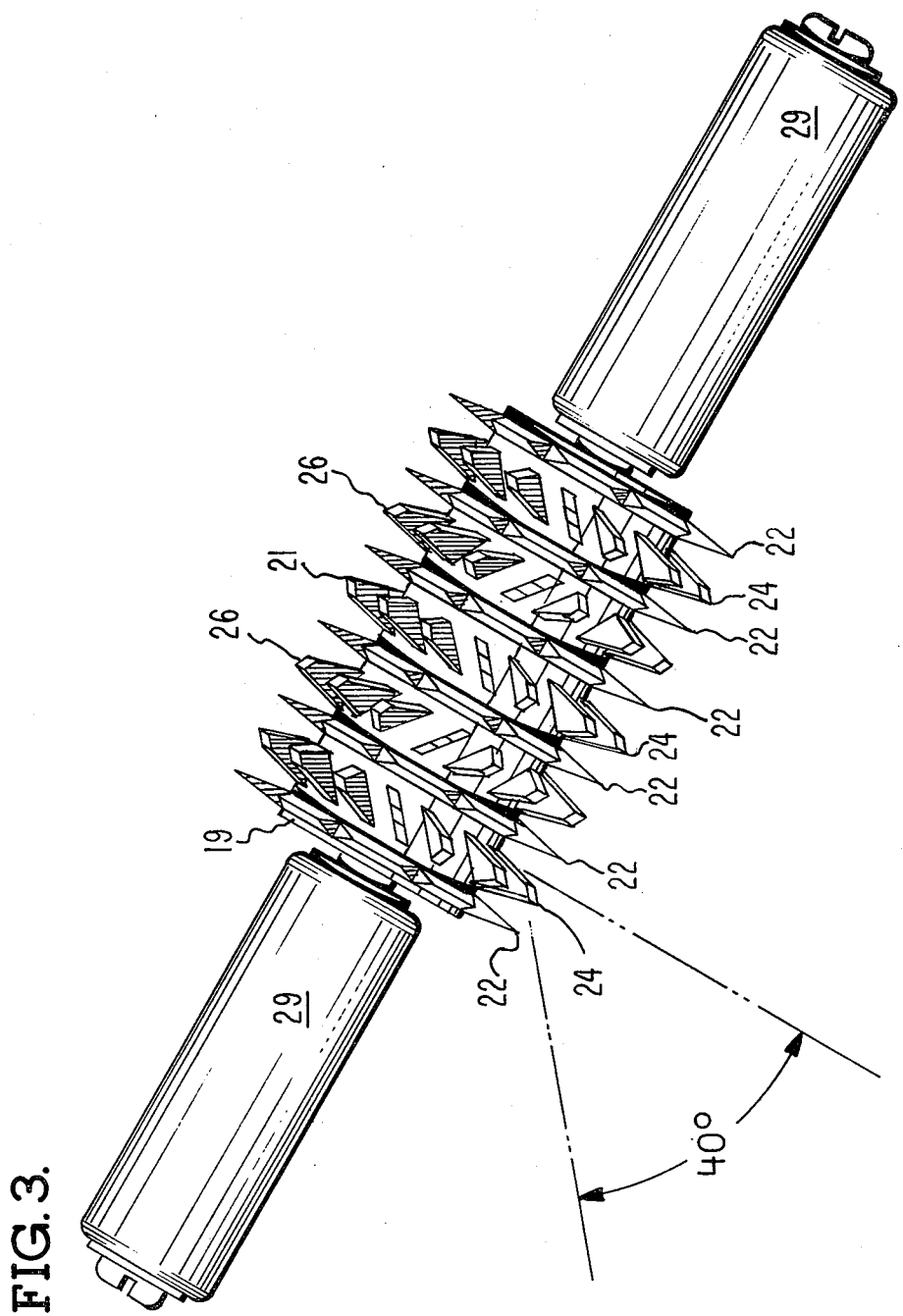

HAND OPERATED STEAK TENDERIZER AND CUBER

BACKGROUND OF THE INVENTION

Commercially available steak tenderizers have long been known in the meat processing and rendering industry, and may be found today in practically every retail meat market and meat department of every supermarket. These commercial models are electrically operated, and are comprised essentially of two parallely disposed and supported tooth-bearing cylinders the elongated teeth of which are so intermeshed as to progressively pierce through a steak or the like as the latter is inserted into a throat of the device and feedably driven between the teeth of the tooth-bearing cylinders. Steaks that have been so processed and thus subjected to such progressive piercing are commonly referred to as "cubed" steaks.

In addition to these commercially available steak tenderizer or cubers, mallet-type meat tenderizers have long been known and used in the home. These mallet-like tenderizers have commonly been made of metal with a relatively heavy head that serves to support a plurality of symmetrically arranged metallic protuberances, such protuberances commonly being provided on opposite sides of the head. Although these mallet-type home tenderizers have proven to be reasonably effective in breaking down the surface tissue of steaks and the like, their use has required considerable effort, particularly on the part of housewives who in the process of delivering the required hammer-like blows may tire before the meat is fully tenderized.

SUMMARY OF THE INVENTION

It is accordingly an object of the present invention to provide an improved meat tenderizer that may be used in the home with minimum effort and maximum convenience on the part of the housewife.

It is another object of the present invention to provide a light-weight meat tenderizer that need not be wielded in hammer-blow fashion, but that tenderizes steaks and the like by merely pressably passing the bladed cylinder thereof over the steaks planar surfaces, tenderizing being accomplished by cuttably severing the surface tissues rather than by breaking the tissues down through repeated impacting.

An important aspect of the present invention is the provision of a rotatable cylinder supported by a handle member, the cylinder being provided with a plurality of truncated triangular cutting blades arranged in rows normally oriented relative to the axis of rotation of the cylinder, whereby upon pressably passing the cylinder along the planar surfaces of a steak or the like, the surface tissue of the steak is cuttably severed to thereby effect tenderization of the steak.

Another important aspect of the present invention is the angular arrangement of the truncated triangular cutting blades within the individual rows thereof, alternating rows along the cylinder having their blades disposed in perpendicular relationship to the axis of rotation of the cylinder, rows adjoining these alternating rows having their blades acutely angled relative to the axis of rotation of the cylinder, with alternating rows of these adjoining rows having their blades oppositely angled relative to the blades of their alternately adjoining acutely angled rows.

BRIEF DESCRIPTION OF THE DRAWING

These and other objects, advantages, and features of the invention will become more readily apparent from the following detailed description when read in conjunction with the accompanying drawing figures, in which:

FIG. 3 is a plan view of another embodiment of the invention wherein a double-handled shaft is shown in co-axial relationship to the cylinder.

DESCRIPTION OF THE PREFERRED EMBODIMENT

The invention resides in the provision of a hand-supported rotatable cylinder along the curved surface of which are fixed a plurality of truncated triangular cutting blades in rows normally oriented relative to the axis of rotation of the cylinder, the individual cutting blades arranged in alternating rows being perpendicularly oriented relative to the axis of rotation of the cylinder, the individual cutting blades arranged in the rows adjoining these alternating rows being acutely angled relative to the axis of rotation of the cylinder, with alternating rows of these adjoining rows having their truncated triangular cutting blades oppositely angled relative to the cutting blades of their alternately adjoining acutely angled rows, whereby upon pressably passing the cylinder over the planar surfaces of a steak or the like the surface tissue of the steak is cuttably pierced to effectuate its tenderization.

Figure 1:
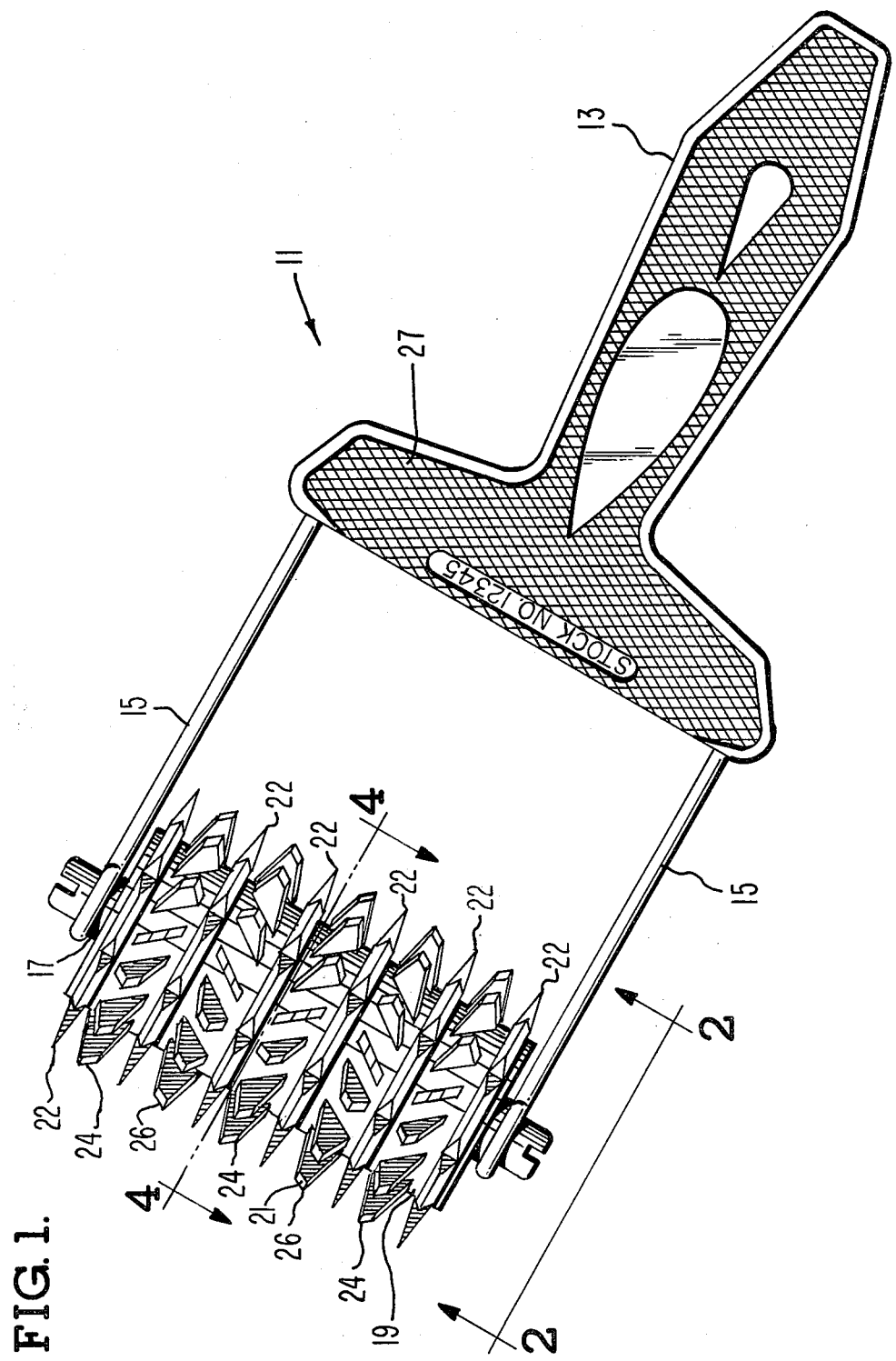
FIG. 1 is a plan view of the inventive steak tenderizer showing its various elements and showing in particular the angular configuration of the cutting blades disposed along the rotatable cylinder.
Figure 2:
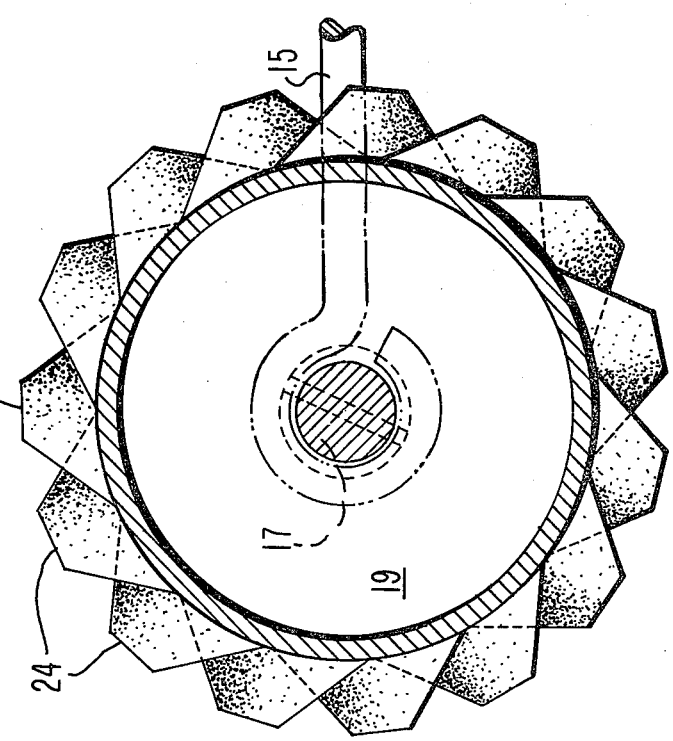
FIG. 2 is an end view of the rotatable cylinder showing the contiguous row of cutting blades disposed in normal relationship to the axis of rotation of the cylinder.
Figure 4:
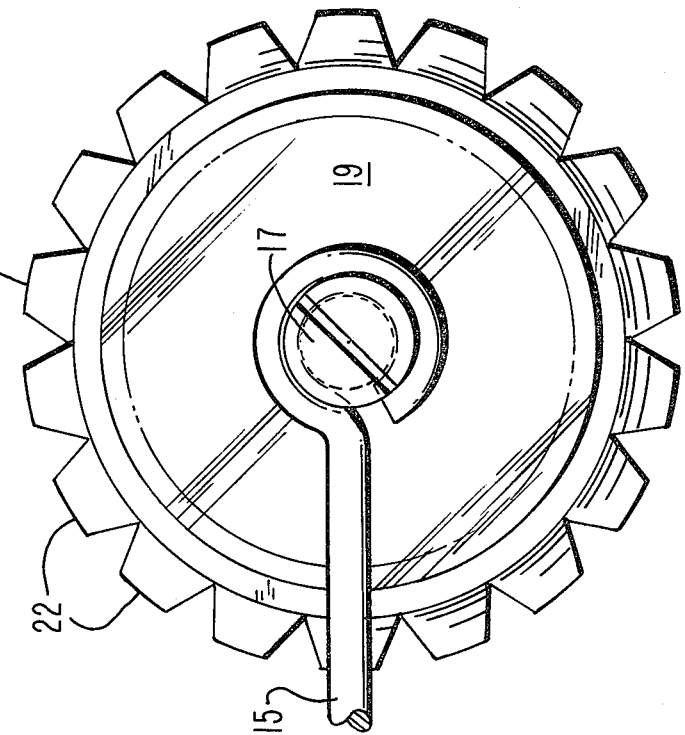
FIG. 4 is a cross-sectional view of the cylinder taken along the line 4—4 of FIG. 1 and showing the contiguous row of cutting blades disposed in acute-angle relationship to the axis of rotation of the cylinder.

With reference to FIG. 1, the inventive meat tenderizer generally designated at 11 is comprised of a handle portion 13 and a pair of handle extensions 15. Journaled within apertures formed in the outermost extremities of the handle extensions 15 is an axle 17 of a rotatable cylinder 19. Along the curved surface of the rotatable cylinder 19, as shown in FIGS. 1, 2 and 4, are a plurality of truncated triangular cutting blades 21 which are disposed in rows bearing a perpendicular relationship to the axle 17, or in other words, to the axis of rotation of the cylinder 19. As best seen in FIG. 1, the truncated triangular cutting blades 21 arranged in rows along the curved surface of the cylinder 19 are variously angled relative both to the axis of rotation of the cylinder and to the cutting blades disposed in adjoining rows thereof. Alternating rows of truncated triangular cutting blades, designated 22 in FIG. 1, have their cutting blades disposed at right angles to the axis of rotation of the cylinder 19, whereas alternately adjoining rows, designated 24 and 26 in FIG. 1, have their cutting blades acutely angled relative to the axis of rotation of the cylinder with the cutting blades arranged in rows designated 24 being oppositely angled relative to the cutting blades arranged in rows designated 26.

The individual truncated triangular cutting blades 21 are preferably three eighths of an inch in length, and three eighths of an inch in depth, with a cutting edge three sixteenths of an inch long. The rows designated 22, 24 and 26 in FIG. 1 are preferably three eighths of an inch apart, with the individual blades in each row being positioned three eighths of an inch apart.

The handle portion 13 may be formed of stainless steel tubing, as may the handle extensions 15. The handle portion 13 may also contain a basket-type inlay generally designated at 27. The rotatable cylinder 19 may be constructed of any suitable plastic material, such as polyethylene, with the truncated triangular cutting blades 21 being formed of light material, as by the extrusion method.

Another embodiment of the inventive steak tenderizer is illustrated in FIG. 3, wherein a double-handle 29 extending co-axially through the cylinder 19 is shown. This arrangement may prove suitable should it be desired to apply more pressure to the cylinder as it is passed over the planar surfaces of a steak or the like.

Although the inventive steak tenderizer has been described in considerable detail, it will be appreciated that various changes therein may be made by those skilled in the art without departing from the true spirit and scope of the invention.

What is claimed is:

1. A hand-operated meat tenderizer comprising a handle portion, a cylinder rotatably supported by said handle portion, and a plurality of cutting blades disposed along the curved surface of said cylinder in predetermined and varying angular relationship to the axis of rotation thereof, whereby when said cylinder is pressably and rotatably passed over the planar surfaces of a cut of meat said surfaces are cuttably pierced in such manner as to effect tenderization of the meat, said cutting blades being truncated triangular in configuration and arranged along the curved surface of said cylinder in rows normally oriented relative to the axis of rotation thereof, said cutting blades within each row bearing a predetermined common angular relationship to said axis of rotation of said cylinder, said predetermined common angular relationship of said cutting blades within a given row differing from the predetermined angular relationship of the cutting blades within adjacent rows, said cutting blades within alternating rows being arranged in perpendicular relationship to said axis of rotation of said cylinder, and said cutting blades within the rows adjoining said alternating rows being acutely angled relative to said axis of rotation, with alternating rows of said adjoining rows having their cutting blades oppositely angled relative to the cutting blades of their alternately adjoining acutely angled rows.

2. A hand-operated device effective for tenderizing and cubing steaks or the like comprising a handle member, a rotatable member supported by said handle member and a plurality of truncated triangular cutting members carried by said rotatable member and arranged in rows normally oriented relative to the axis of rotation of said rotatable member, whereby when said rotatable member is pressably passed over the planar surfaces of a steak or the like, said surfaces are effectively pierced by said cutting members, said rotatable member being a cylinder along the curved surface of which said plurality of cutting members are disposed, said cutting members within each of said rows bearing a predetermined common angular relationship to said axis of rotation of said cylinder, said predetermined common angular relationship of said cutting members within a given row differing from the predetermined angular relationship of the cutting members within adjacent rows, said cutting members within alternating rows being arranged in perpendicular relationship to said axis of rotation of said cylinder, and said cutting members within the rows adjoining said alternating rows being acutely angled relative to said axis of rotation, with alternating rows of said adjoining rows having their cutting members oppositely angled relative to the cutting members of their alternately adjoining acutely angled rows.

* * * * *